United States Patent [19]

Lister

[11] Patent Number: 4,936,393

[45] Date of Patent: Jun. 26, 1990

[54] PNEUMATIC TOOL

[75] Inventor: William Lister, Moorooka, Australia

[73] Assignee: The Lister Corporation Pty. Ltd., Brisbane, Australia

[21] Appl. No.: 82,626

[22] Filed: Aug. 7, 1987

Related U.S. Application Data

[63] Continuation-in-part of Ser. No. 379, Dec. 9, 1986.

[30] Foreign Application Priority Data

Dec. 9, 1985 [AU] Australia .............................. PH3779

[51] Int. Cl.[5] ................................................ B23Q 5/00

[52] U.S. Cl. ...................................... 173/13; 173/134; 173/14; 173/17

[58] Field of Search .................................... 173/13-17, 173/134, 135, 128

[56] References Cited

U.S. PATENT DOCUMENTS

| | | | |
|---|---|---|---|
| 3,912,023 | 10/1975 | Amstberg | 173/13 X |
| 3,970,153 | 7/1976 | Gien et al. | 173/17 |
| 4,084,646 | 4/1978 | Kurt . | |

FOREIGN PATENT DOCUMENTS

| | | |
|---|---|---|
| 29417/71 | 11/1972 | Australia . |
| 43820/79 | 1/1979 | Australia . |
| 373639 | 4/1923 | Fed. Rep. of Germany . |
| 662882 | 8/1929 | France . |
| 806-399 | 2/1981 | U.S.S.R. . |
| 946-913 | 7/1982 | U.S.S.R. . |
| 1196-255 | 12/1985 | U.S.S.R. . |
| 1592682 | 6/1981 | United Kingdom . |

*Primary Examiner*—Frank T. Yost
*Assistant Examiner*—Willmon Fridie, Jr.
*Attorney, Agent, or Firm*—Foley & Lardner, Schwartz, Jeffery, Schwaab, Mack, Blumenthal & Evans

[57] ABSTRACT

A pneumatic percussion tool for rock breaking and other purposes having removably enclosed within an outer casing a pneumatic engine including a cylinder with a work head extending slidably from its lower end, a piston slidable in the cylinder impacting the work head on its downstroke. The piston serves also as a sliding valve into which compressed air is admitted through an air inlet tube fixed coaxially in the cylinder and on which the piston is slidable. The piston and cylinder are formed with such air ports and passages that the engine remains at rest until the work head applied with pressure to a work-piece is retracted into the cylinder displacing the piston valve which thereupon is reciprocated, causing the work head to deliver percussive blows while applied to the work-piece. At the final part of its upstroke, the piston enters a compression chamber or energy cell which thus decelerates the piston and commences its downstroke.

6 Claims, 1 Drawing Sheet

PNEUMATIC TOOL

This is a continuation-in-part application under 35 U.S.C. 365(c) of International Application No. PCT/AU86/00379, filed Dec. 9, 1986.

BACKGROUND OF THE INVENTION

Field of the Invention

This invention relates to a pneumatic percussion tool, used for delivering, through a work head, rapid percussive strokes.

SUMMARY OF THE INVENTION

The invention has been devised with the general object of providing such a tool usable, for example, for rock-breaking, digging, riveting, hammering, pile-driving or spike-driving, and which, in use, may be under constant pneumatic pressure which is immediately available to perform work when, and as long as, the tool head is applied with pressure to a work-piece.

Other objects achieved in preferred embodiments of the invention are to provide such a tool which is simple and economical to manufacture, sturdy and durable, muffled for noise reduction and of which the working parts may be quickly and easily removed for maintenance or replacement if worn or damaged, or for substitution of one kind of work head for another.

With the foregoing and other objects in view the invention resides broadly in a pneumatic percussion tool including:

a pneumatic cylinder;

a work head extending slidably from an end of the cylinder;

a piston slidable in the cylinder to impact and advance the work head on its downstroke;

means for introducing air under pressure to the cylinder, the cylinder being ported for the admission and direction of air under pressure, the piston being also a sliding valve and the parts being so made and arranged that the work head, when forced inwardly relative to the cylinder, moves the piston valve to such position that it is impelled pneumatically on its upstroke and is automatically returned pneumatically on its downstroke.

Preferably the foregoing assembly comprises a pneumatic engine which is enclosed removably in and spaced from an outer casing and which is engageable with any one of a number of interchangeable work heads arranged to be struck and advanced when impacted by the piston, the space between the engine and casing serving as a silencer which is ported to atmosphere.

Preferably the piston, on the final part of its upstroke, enters a compression chamber or energy cell, therein compressing air to bring the piston to rest before impelling it on the beginning of its downstroke. The outer casing may be provided with means for mounting it on a vehicle and for moving it to, or lifting it from, a work-piece.

Other features of the invention will become apparent from the following description.

BRIEF DESCRIPTION OF THE DRAWINGS

In order that a preferred embodiment of the invention may be readily understood and carried into practical effort, reference is now made to the accompanyiny-drawings, wherein.

DETAILED DESCRIPTION OF THE PREFERRED EMBODIMENTS

Figure 1:
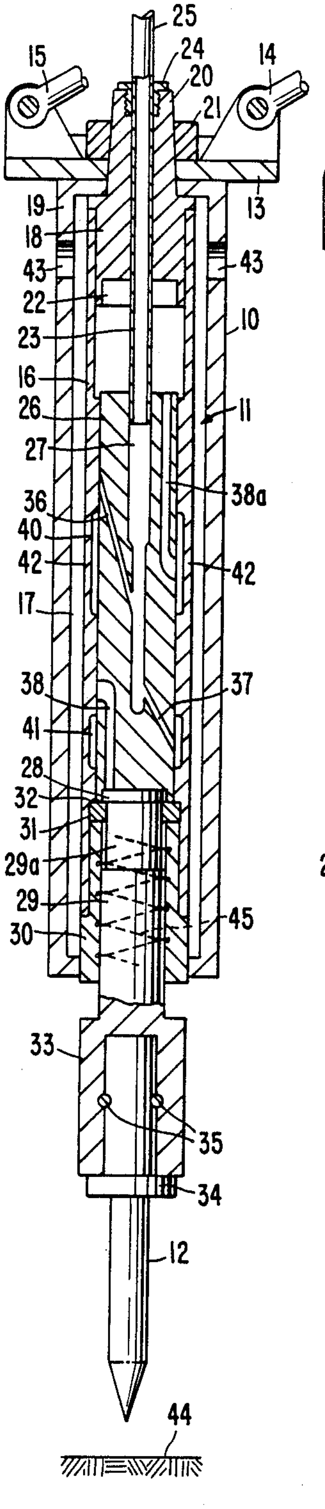
FIG. 1 is sectional view of a rock breaker according to the invention, its work head being at rest in fully extended position clear of a work-piece.

The pneumatic percussion tool illustrated includes an outer casing 10 enclosing a removable pneumatic engine indicated generally at 11, a moil point 12, being one of a number of implements interchangeably engaged with the engine 11.

Although tools according to the invention may be made for manual handling, the example illustrated is of a larger type to be mounted on a power-driven vehicle, and for this purpose a head 13 fixed on the top of the outer casing 10 is made for pivotal connection to the leading ends of a lift arm 14 and an adjustment arm 15, the rear ends of which are pivoted to the vehicle. The lift arm 14 may be raised or lowered by a hydraulic ram (not shown) to raise or lower the tool, and the adjustment arm 15 may be or include a further hydraulic ram so that the angularity of the tool may be adjusted.

The pneumatic engine 11 includes a cylinder 16 located coaxially within and spaced from the casing 10, the space between the two being a chamber 17.

Screwed into the upper end of the cylinder 16 is a plug 18 with a peripheral flange 19 bearing on top of the cylinder. The plug has a reduced-diameter and threaded upper part 20 which passes through an aperture in the head 13 and is engaged by a nut 21 to secure the pneumatic engine 11 removably in the casing 10.

The plug 18 has a cylindrical recess or energy cell 22 formed from below, and is axially bored to accept an air inlet tube 23 which extends for some distance below the plug. A union 24 screwed into the top of the plug locks the air inlet tube in place and connects to it an air hose 25.

An elongated cylindrical piston 26 is slidable in the cylinder 16, and has an axial bore 27 from the top to accept the air inlet tube 23 closely but slidably.

Figure 2:
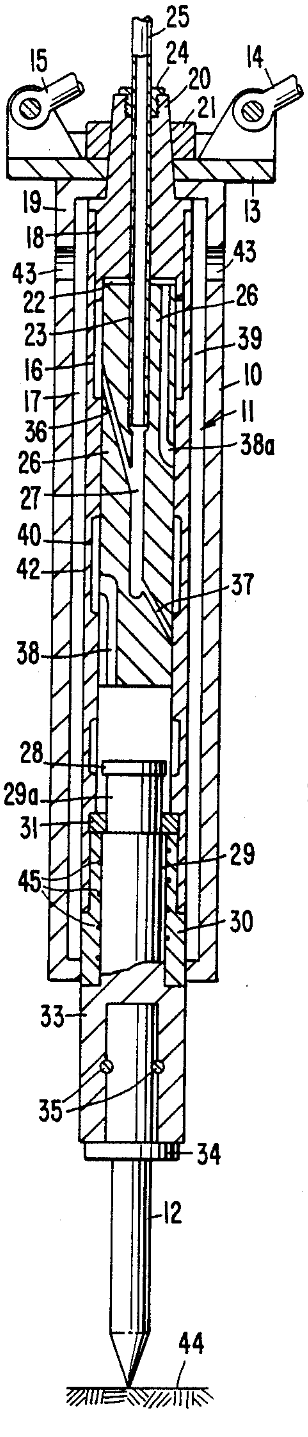
FIG. 2 is similar view of the tool lowered onto the work-piece to cause the work head to be retracted, the piston being driven to the top of its stroke.

On its upstroke, the top of the piston closely enters the recess or energy cell 22 in the plug 18, as shown in FIG. 2. On its downstroke the piston strikes the head 28 of an anvil 29 forming the upper part of a work head and slidable in a sleeve 30 screwed into the lower end of the cylinder 16. Below its head 28, the anvil 29 has a reduced-diameter section 29*a* which is slidable through a split-ring stop 31 held between an internal shoulder 32 in the cylinder 16 and the top of the sleeve 30. This annular stop 31 limits the slidable movement of the anvil.

The work head includes a chuck 33 below the anvil and formed integrally with it. The chuck 33 is axially bored from below to receive the upper part of the moil point 12, which has a peripheral flange 34 against the bottom of the chuck. The moil point is held releasably in the chuck by a pair of retaining pins 35.

Upper and lower bore ports 36 and 37 lead obliquely from the upper and lower parts respectively of the piston bore 27 through the piston to the cylinder 16. Bottom and top end ports 38 and 38*a* lead from the bottom and top of the piston and out through the piston wall.

The bore of the cylinder 16 has upper, middle and lower enlargements of diameter. The upper enlargement forms about the piston, when the piston is raised, a top annular chamber 39. The middle enlargement forms about the piston at all times a middle annular chamber 40, and the lower enlargement forms about the lowered piston a bottom annular chamber 41. Air outlet ports 42 lead radially from the middle annular chamber 40 to the chamber 17 between the cylinder 16 and the casing 10, and exhaust ports 43 lead from the upper part of the casing 10.

When, as shown in FIG. 1, the device is ready for use but not applied to a work-piece 44, the moil point 12 is in its fully extended position, the anvil head 28 supported by the split-ring stop 31. The piston 26 is also fully lowered and resting on the anvil head 28. Compressed air introduced through the air hose 25 and the air inlet pipe 23 to the piston bore 27 cannot escape to do work and so the engine is at rest, or in neutral position.

Figure 3:
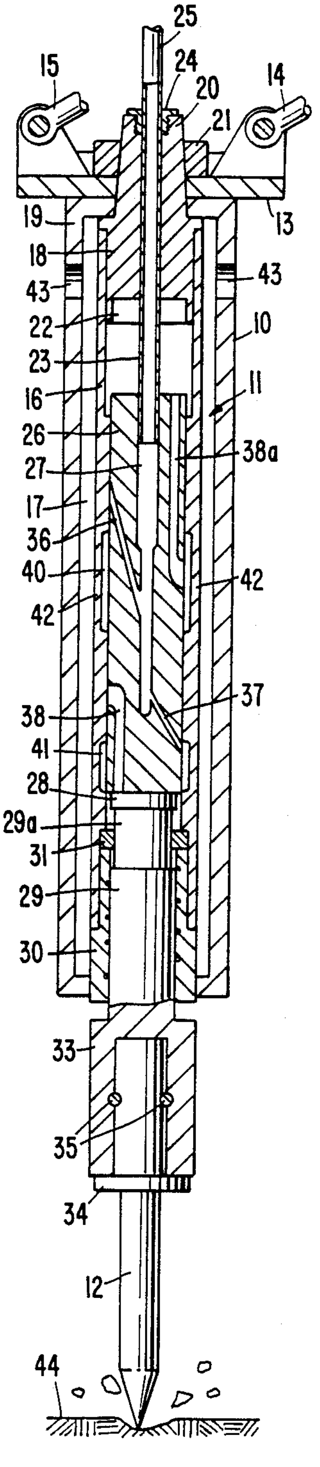
FIG. 3 is a similar view of the tool with the piston having driven the work head onto the work-piece.

When the tool is lowered to bring the moil point 12 down onto the work-piece 44, as shown in FIG. 2, then, relative to the cylinder 16, the anvil 28 is raised to fullest extent, lifting the piston 26 so that compressed air, fed through the lower bore port 37 to the bottom annular chamber 41, leaves this chamber below the piston, which therefore is driven upwards before the lower bore port 37 is closed. The top of the piston 26 enters the plug recess or energy cell 22 compressing air therein and decelerating the piston. Air under pressure below the piston escapes through the bottom port 38 to the middle annular chamber 40 and thence through air outlets 42, the chamber 17 and exhaust ports 43 to atmosphere. The air compressed in the plug recess or energy cell 22 commences the downstroke of the piston, and compressed air fed through the upper bore port 36 to the top annular chamber 39, before exhausting through top port 38*a*, impels the piston onto the anvil head 28, as shown in FIG. 3, driving the moil point 12 into the work-piece 44.

As long as the moil point 12 is pressed against the work-piece 44 it will, in this manner, continue to make rapid percussive strokes; but if the work head is lifted from the work-piece, or if the work-piece breaks away from the moil point, the piston 26 will be able to move down to its neutral position, as shown in FIG. 1, the operation of the tool thereupon automatically ceasing.

To prevent any action of the tool when the piston is in its neutral position, due to leakage of compressed air, a small helical bleed passage 45 is formed within the bore of the sub 29.

The pneumatic engine can be quickly and easily removed from the casing 10 by unscrewing the union 24 and the nut 21. In the event of any breakage or undue wear of the engine it may be replaced with very little down time. The pneumatic engine being suspended from the top of the casing 10, any stress or misalignment that may occur through rough handling of the unit will not be likely to affect the engine adversely. The tool may be worked with precision and maximum effect since it commences operation only when positioned firmly against a work-piece.

Irrespective of the position of the piston 26 in the cylinder 16, the upper part of the cylinder and the top chambers 34 thereof are under high air pressure, to form an air bearing in which the piston reciprocates freely. Mist lubrication may be introduced with the compressed air to reduce wear and tear of piston and cylinder and assist sealing to give accelerated air flow and an increase of piston cycles. The unit is self-cleaning, and during operation the air, with entrained lubricant, flushes the whole of the inside of the pneumatic engine with each stroke, any particles of foreign matter being expelled from the unit.

As the piston is decelerated at the conclusion of its upstroke by the compression of air in the plug recess or energy cell 22, so it is decelerated at the conclusion of a downstroke when the piston descends below the bottom annular chamber 41. Compressed air between the piston and the anvil head 28 commences the upward movement of the piston.

If desired, secondary exhaust ports may leave the chamber 17 at its bottom to assist in blowing dust and small particles from the work-piece.

Pneumatic tools according to the invention will be found to be very effective in achieving the objects for which they have been devised. It will, of course, be understood that the particular embodiment of the invention herein described and illustrated by way of example only, may be subject to many modifications of constructional detail and design, which will be readily apparent to persons skilled in the art, without departing from the scope and ambit of the invention hereinafter claimed.

What is claimed is:

1. A pneumatic percussion tool including:
   - an outer casing;
   - a pneumatic cylinder removably mounted coaxially in said outer casing;
   - a work head extending slidably from one end of the cylinder;
   - a piston slidable in the cylinder to impact upon and advance the work head on its downstroke; said piston containing intake ports for the admission and direction of compressed air, thereby serving as a sliding valve;
   - exhaust ports communication with said work head, air being exhausted to the atmosphere from said outer casing by way of said exhaust ports; and
   - means for introducing air under pressure to said intake ports;
   - wherein the upstroke of said workhead moves said piston upwardly and thereby admits compressed air from said lower bore port to the area between the work head and the piston to impel the piston pneumatically upwards, the piston in its upward position opening the cylinder thereabove to compressed air, thereby impelling said piston pneumatically downward.

2. A pneumatic percussion tool according to claim 1, wherein the piston, on the final part of its upstroke, enters, and compresses air in, an upper compression chamber or energy cell, thereby decelerating the piston and starting it on its downstroke.

3. A pneumatic percussion tool according to claim 1, wherein the piston, during the final part of its downstroke, enters and compresses air in a lower compression chamber or energy cell, thereby decelerating the piston and starting it on its upstroke.

4. A penumatic percussion tool according to claim 3, further including a restricted bleed passage leading into the atmosphere from the lower compression chamber or energy cell.

5. A pneumatic percussion tool according to claim 1 wherein the work head comprises;
   - an anvil slidable in the cylinder;
   - means for limiting the slidable movement of the anvil;
   - a chuck on the outer end of the anvil; and
   - an implement releasably engaged by the chuck.

6. A pneumatic percussion tool according to claim 1 wherein said outer casing includes means for connection to lifting and angle-adjusting arms of a vehicle.

* * * * *